July 21, 1925.

J. REECE

POWER TRANSMISSION

Filed Jan. 25, 1922

John Reece
Inventor, by Rogers, Kennedy & Campbell,
Attorneys.

Patented July 21, 1925.

1,546,405

UNITED STATES PATENT OFFICE.

JOHN REECE, OF BOSTON, MASSACHUSETTS, ASSIGNOR TO REECE TRANSMISSION COMPANY, OF BOSTON, MASSACHUSETTS, A CORPORATION OF MAINE.

POWER TRANSMISSION.

Application filed January 25, 1922. Serial No. 531,594.

*To all whom it may concern:*

Be it known that I, JOHN REECE, a citizen of the United States, residing at Boston, in the county of Suffolk and State of Massachusetts, have invented certain new and useful Improvements in Power Transmission, of which the following is a specification, reference being had therein to the accompanying drawing.

This invention relates to power transmission and involves a novel method and apparatus adapted to use in various situations and for various purposes where varying speeds of transmission are required, for example, as a part of the power transmission apparatus of motor vehicles.

The general object is to provide improved power transmission for motor vehicles or other machines, and more particularly to afford a mechanism in which the speed ratio, and torque are self adjusting to the road coditions or resistance. In the case of a motor vehicle the regulation of the ratio between the engine shaft and the driven parts may be said to be semi-automatic between the maximum and minimum ratios; by which I mean that when the mechanism has been set for either forward or reverse drive the speed will be regulated without any action by the operator other than more or less opening of the throttle of the engine; also, with a set position of the throttle the action of speed ratio adjustment to meet all driving requirements is wholly automatic, and such that when the load or resistance opposed by the driven shaft increases so as to require greater torque than the engine can transmit with the existing speed ratio, a readjustment of action takes place so that the ratio is automatically reduced and the torque thereby raised to whatever is necessary to maintain the driven parts in rotation. In the case of a vehicle passing from level ground to uphill the action automatically changes to give the required torque for the additional work, the driven speed becoming correspondingly reduced, thus eliminating the many objections to the prevailing speed change mechanisms.

Further objects are to afford a mechanism in which, when running at full speed, that is at unit ratio, there will take place no internal motion or substantial action of the parts of the mechanism; also to give quietness and smoothness of action; and to minimize transmission of vibrations from the engine to the driven parts. Also it is an object to afford a simple and effective means of reversing the drive; to afford a mechanism which will permit free running when set for either forward or reverse drive, for example, when it is desired to allow the car to run freely on a down grade, this condition taking place purely automatically with the present invention. Among other objects and advantages are the ability to bring the vehicle to a stop on an uphill grade without the use of a brake; the ability to lock the car against drive in either direction, for example, when performing test operations of the mechanism in the garage; and the ability to allow the vehicle to move downhill backwardly by merely slowing the engine to a point where sufficient torque is not being maintained to hold the car on the hill. Other objects and advantages of the invention will be made clear in the hereinafter following description of one form or embodiment thereof, or will be obvious to those skilled in the art.

To the attainment of the objects and advantages mentioned, the present invention consists in the novel variable speed transmission and the novel features of combination, arrangement, mechanism, design, detail and method herein described or claimed.

Preliminarily it may be stated that the present invention involves, in combination with the driving member or engine shaft and the driven member or shaft, the novel connections or mechanism characterizing the invention, comprising movable weights or masses which are acted upon by the centrifugal force produced by the rotation, and utilizing the centrifugal force in the process of transmitting the energy at varying ratios and torques. In a general way such a plan has been tried by the use of a planetating weight which, as it is drawn toward the axis of the system, against centrifugal force, operates to transmit energy to the driven parts, until, passing its extreme position, it is thrown outwardly, later to repeat the operation; this plan involving intermittency of action and necessitating a pawl and ratchet or equivalent device to insure oneway advance of the driven parts, and rendering desirable an equalizing reservoir or spring so that the successive impulses may be transmitted steadily to the driven parts.

The present invention dispenses with this two-phase action, and with the pawl and ratchet and transmitting spring incurred thereby; in one aspect this being accomplished by discarding the planetating centrifugal weight and replacing it by a wheel or other carrier, actuated by the relative rotation of the driving and driven shafts, or by reason of their difference in speeds, so as to cause the stream or succession of weights or masses to be forced inwardly against the centrifugal pressure, thereby giving a steady and continuous driving thrust upon the driven shaft; the effect of centrifugal force on such masses, after reaching their inward extreme position, being eliminated from action upon the driven shaft, for example, by their discharge from the main or transmitting carrier or wheel, and their reception upon a secondary or return carrier, on which the weights travel outwardly, the pressure of centrifugal force thereon effecting a restoration of energy to the driving parts, and the identical masses preferably thereafter being again fed or delivered to the main carrier, so as to constitute a circuit and maintain continuously the described transmitting and energy conserving operations. The broad principles involved can be embodied in an infinite number of forms, and can be stated in different terms, more broadly in some cases than in the aspect just set forth; and it will therefore be understood that the hereinafter following description and the accompanying drawings are merely for the purpose of illustration, without intention of restricting the invention beyond the basic principles involved.

In the accompanying drawings Fig. 1 is substantially a central longitudinal vertical section view of one form or embodiment of a transmission apparatus embodying the principles of the present invention, the control handle shown adjusted to engage both clutch devices, preventing either forward or reverse drive of the driven shaft, and therefore holding it locked.

Figure 1:
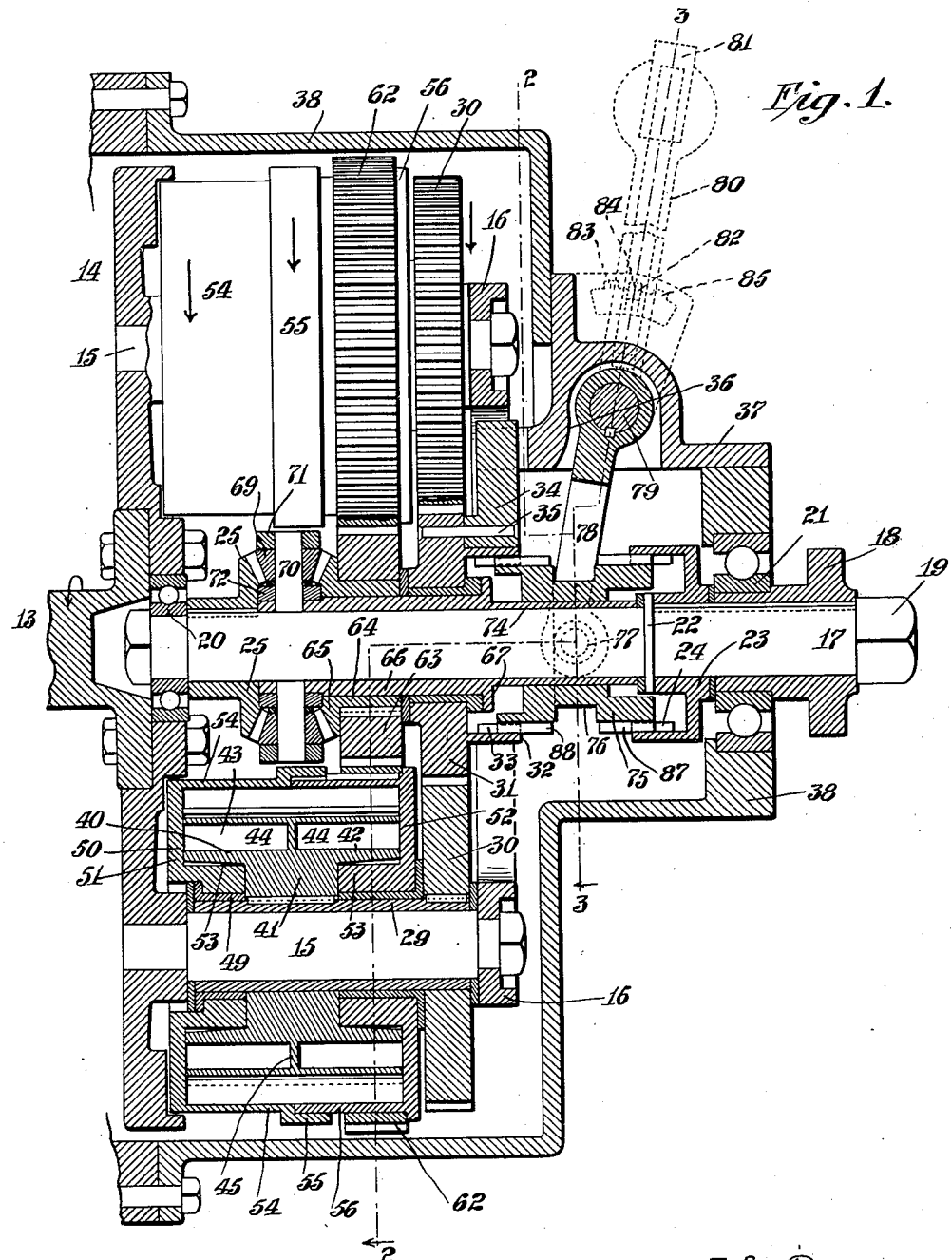

The driving member 13 may be the crank shaft of an internal combustion engine, such as is chiefly used on motor vehicles; and attached to the shaft is shown a wheel, disk or support 14 which, with the mechanism that rotates with it, may be considered as the fly wheel, and gives the steadying effect of the fly wheel, customarily used with such engines. Projecting toward the right from the fly wheel disk 14 are a series of studs 15, the other ends of which are interconnected and stiffened by a supporting ring 16, said studs serving to support certain of the mechanisms to be hereinafter described. The elements 13 to 16 are rigidly connected and may be considered as the driving member of the combination.

The driven parts comprise the member or shaft 17, which it is desired to operate at varying speed ratios relative to the driving member. The right end of the shaft 17 is shown provided with a member 18, which may be part of the usual universal connection to a further transmitting shaft, and is confined by a nut 19. A ball bearing 20 may be provided at the left end of the driven shaft and a similar bearing 21 near the right end. The shaft is shown formed with an integral flange 22 for the purpose of securing certain parts against endwise play. Confined between the flange 22 and the member 18 is a tooth member 23, this and the member 18 being both keyed to the shaft so as substantially to constitute rigid portions of the driven member. The purpose of the teeth 24 on the member 23 will subsequently appear. Keyed upon the left end of the driven shaft is a bevel gear 25. The described elements 17 to 25 are rigidly interconnected, and taken together may be considered as the driven member of the combination.

The general nature or principles of the mechanism intermediate the driving and driven members has been indicated. It may take different forms, that which is shown sufficiently illustrating the principles. It has been stated that the succession or stream of masses which give the vital action to the present mechanism is moved toward or from the axis of the system on a carrier or carriers, and while these carriers might take various forms, in fact any form that will serve to compel the successive masses to travel inward against centrifugal force, I believe the simplest form of carrier to be, and have shown it as, a planetating wheel, disk or similar rotary carrier. It will be understood that each of these rotary, planetating carriers is preferably a balanced member, therefore free from centrifugal force, but owing to its reception of the succession or stream of masses, by means of containers, pockets or other receptacles, it is enabled to take part in the action whereby centrifugal force is utilized in the transmission of the rotary energy to the driven parts, the carrier discharging the successive weights near their extreme inward position, so that the centrifugal pressure will always be unbalanced, at one side only of the carrier. The discharged weights are preferably received by a second, concentric carrier which conveys them smoothly, without heat or injury, to an outward point, where they are redelivered to the first mentioned carrier, the weights thus passing through a continuous path and cycle, acting on the main carrier in one phase, opposed by centrifugal force, and acting on the other carrier in the second phase, assisted by centrifugal force; this circulation of the masses however ceasing whenever there occurs a correspondence in the speeds of the driving and driven members, which condition causes cessation of planetating motion of the main or transmitting carrier.

While the main carrier is interposed between the driving and driven members, and rotates by reason of their difference of speed, and thereby ceases rotation when the speed ratio is unity, the second or return carrier is preferably interposed between the driving member and a stationary element, so that it is in constant rotation, at a suitable speed, as long as the engine and fly wheel are in motion. Reacting against the stationary element the return carrier, urged by centrifugal force, whenever it is engaged by centrifugal masses, operates to throw the energy thereof into the fly wheel, thus conserving the energy, which necessarily is eventually delivered to the driven shaft, constituting a factor in securing increase of driving torque, accompanied by reduction of speed ratio. In some cases the return carrier could be dispensed with, allowing the centrifugal masses to find their way from discharge to feed position in the main carrier, or otherwise providing for their feed, but only at a loss of power, accompanied by other disadvantages, and I therefore prefer the combination of the two carriers, and will continue the description of the present invention upon that basis.

The two rotary, planetating carriers, transmitting and return, are preferably arranged in close association with each other, in fact one concentrically within the other, the transmitting carrier being naturally the outer one and the return or secondary carrier the inner one. Instead of a single group of such transmitting and return carriers I prefer to employ a number of such groups and have shown four of them, mounted respectively on the four studs 15 provided at the interior side of the fly wheel or driving member 14. The construction and arrangement of the inner and outer carriers on each of the studs and their mode of connection respectively to stationary and to the driven parts of the machine will now be described.

Each planet stud 15 is shown surrounded by a rotating sleeve 29. This is to support and drive the return carrier, and for this purpose the following connections to stationary elements of the apparatus may be used, so arranged that the rotation of the driving member or fly wheel causes a continuous planetating rotation of the sleeve and carrier. A gear 30 is keyed to the loose sleeve 29. This planetating gear 30 is engaged with a non-rotating pinion 31 concentric with the main axis of the apparatus and in fact loose upon the driven shaft or rather loose upon a sleeve which surrounds the shaft. In order to hold the central pinion 31 stationary it is shown as having a cylindrical extension 32 toward the right. In passing I mention teeth 33 formed at the interior of this extension, for the purpose of reversing action as will be described. For anchoring the stationary pinion 31 its extension 32 has an outwardly extending arm 34, secured to it by rivets 35, which arm is anchored or held against rotation by engagement between the two sides of a fork 36 formed on the stationary frame casing 37, which in turn is secured in fixed relation to the outer frame casing 38 which is shown as enclosing substantially all of the mechanism involved in the described embodiment of my invention.

The inner or return weight carrier 40 is keyed, through its hub 41, to the planetating sleeve 29. The carrier is preferably formed with a series of weight holders, for example, in the following manner. From the cylindrical inner wall 42 extend a series of walls or partitions 43 of the shape shown or other suitable shape, arranged to form a series of holders in the form of chambers or pockets 44, which may be closed at their ends by the elements 51, 52, later described. Each pocket 45 may be separated into two parts by a wall 45, for the purpose of strengthening the construction. The rotation of the carrier being counterclockwise in Fig. 2 each pocket or chamber 44 preferably has its opening 46, for entrance and discharge of the series of centrifugal weights or masses, at the rear portion of the chamber, as shown.

Figure 2:
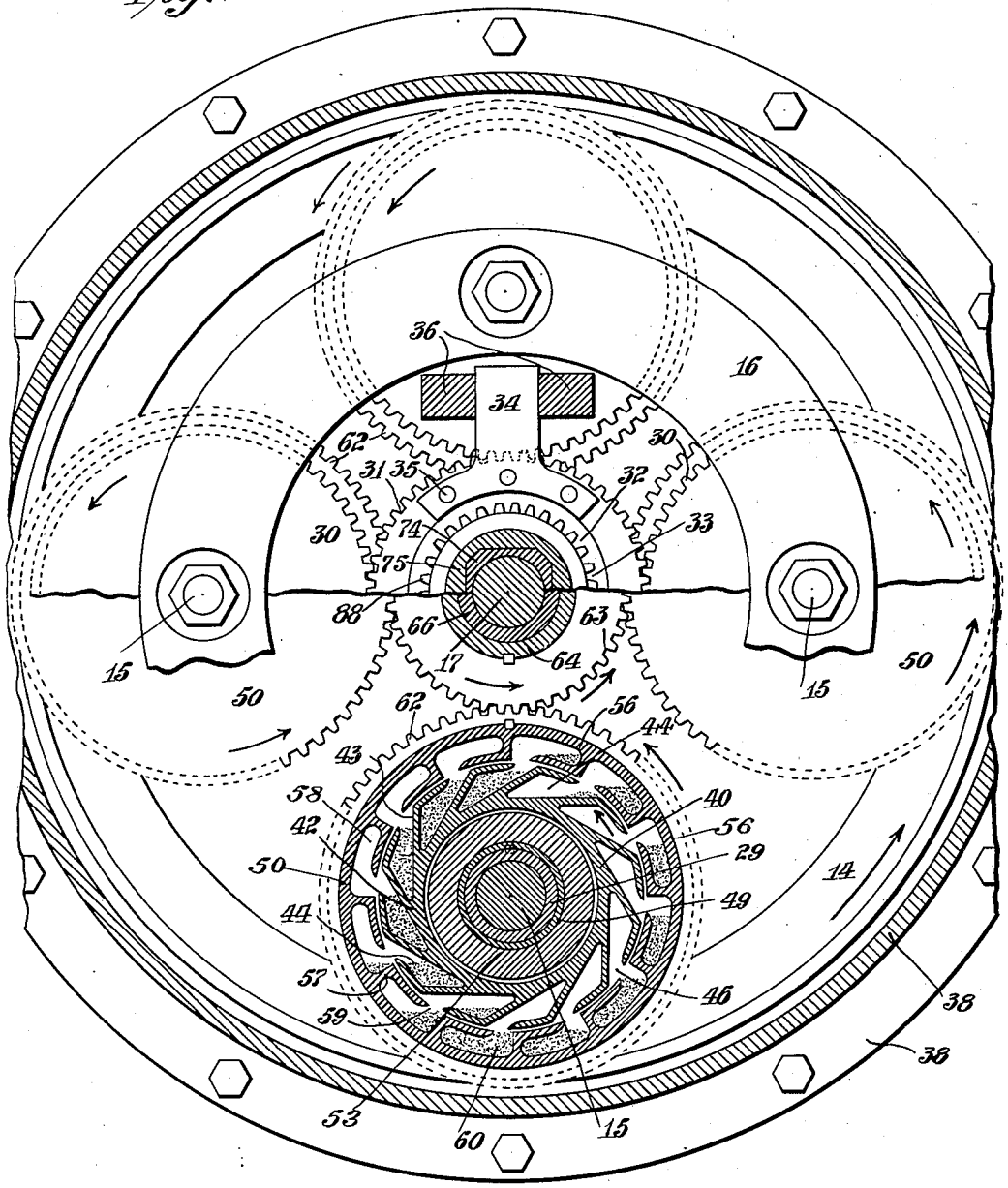
Fig. 2 is a transverse section taken on the broken line 2—2 of Fig. 1, with the reversing arm 78 and connecting parts omitted, and as this figure does not indicate the adjustment, it may be considered as representing either the condition of Fig. 1, or the condition of the parts when the driven shaft is being driven at reduced (not at unity) ratio.

The main or outer carrier or planetating wheel 50, loosely surrounding the planet sleeve 29, with a bushing 49 between to afford a suitable bearing surface, also rotates counterclockwise in Fig. 2, but unlike the interior carrier, the speed of the main carrier changes with the speed ratio, its planetating speed being zero when the ratio is unity and increasing to its maximum as the driven speed approaches zero.

The main carrier 50 has an annular left side wall 51, a similar right side wall 52, and a hub 53 for each of these walls, each hub with its wall being separate from the other for purposes of assemblage. Integral with the wall 51 is a cylindrical outer wall 54, having a slightly offset extension 55, giving a snug engagement with the corresponding cylindrical exterior wall 56, integral with the end wall 52, the two exterior walls being preferably keyed as indicated in Fig. 1 so as to constitute of the carrier 50 a substantially rigid unitary structure. The main carrier thus encloses the return carrier 40 both endwise and circumferentially. The weight holders or pockets 44 of the inner carrier face outwardly and are thus enabled to be arranged closely adjacent to similar holders or pockets of the outer carrier, facing inwardly, so that the weights discharged by the main carrier may readily be received in the pockets of the other, carried outwardly, and redelivered to the pockets of the former.

The means on the main carrier 50, for receiving and holding the series of weights or masses is shown as composed by inwardly extending walls or partitions 57 producing a series of chambers or pockets 58, the openings 59 of which, for entrance and exit of masses, being at the forward inner portions of the pockets.

It will be understood that in describing the respective carriers as having weight holders or mass receptacles it is not intended to limit these to pockets, as shown, since obviously any means of engaging the successive centrifugal masses or portions of weight, and forcing or compelling them to move inwardly against centrifugal force, will serve the purposes of the present invention. Physically the weight holders in the present embodiment are shown as taking the form of vanes or buckets because in the present embodiment I have adopted what may be termed flowing weights for the centrifugal masses and the described construction affords suitable retainers or containers adapted to receive the successive weights, carry and force them as described, and discharge them. As flowing weights I might employ spheres, for example, a multiplicity of small, highly polished, steel balls, or on the other hand a liquid, preferably mercury on account of its advantageous density, and the reference 60 applied to the centrifugal weights herein may be considered as referring to portions of mercury, as illustrative of the principles involved. A suitable quantity, a number of pounds, of mercury will simply be placed within the spaces between the two carriers, and it serves the purposes of the present invention, readily dividing itself into a series of weights, imposing centrifugal force as desired, passing inwardly in the weight holders or pockets of the main carrier wheel 50, discharging from such pockets to the pockets of the return wheel 40, imposing centrifugal force on the last mentioned wheel, and being delivered therefrom to the main carrier wheel, for recirculation through the described two phases of centrifugal mass action. The surfaces with which the mercury come in contact should be constructed of material proof against injury by contact with the mercury.

I will next describe the preferred mode in which the main carrier 50 is compelled to rotate, counterclockwise in Fig. 2, at a speed dependent on the existing speed ratio, or proportional to the difference in speed of the driving and driven shafts, so as to force the mass train inwardly against centrifugal force. The planetating carrier being mounted on the driving member, the simplest mode of actuation is to gear it to the driven shaft, and for this purpose a planetating gear 62 is associated with the carrier 50, being shown surrounding and keyed to the carrier, engaging with a central gear 63 keyed to a hub 64, which, during forward drive, or when the driven shaft is locked as in the adjustment shown in Fig. 1, is substantially rigid or fixed with the driven shaft, so that the central gear may be considered as keyed directly to the driven shaft. This assumption is not true when reverse drive is in effect, as will later be described.

The forward driving action can now be explained. It is presupposed that the clutch device is shifted from the Fig. 1 position so that the driven shaft is not locked against rotation but is in rigid connection with the central gear, as will be later explained. It is clear that if the driven shaft and the central gear 63 are held absolutely against rotation, the carrier 50, attached to the planetating gear 62, will merely rotate counterclockwise about the stud 15 as it is carried bodily around with the driving parts. If the planetating carrier 50 is not engaged by centrifugal weights, or otherwise retarded in its rotation, it will simply freely planetate without effect. If now the rotation of the carrier be retarded, for example, by applying centrifugal force through the masses 60, the tendency is to drive forwardly the driven shaft. The centrifugal force referred to is that about the main axis of the apparatus. This will be very considerable, when the fly wheel is at a high speed of rotation. The centrifugal force, for a given mass, increases as the square of the rotary speed. If only a light load opposes the driven shaft, the shaft will be started into rotation by this centrifugal action when it becomes sufficient to resist the planetating rotation of the carrier. With ordinary loads the present invention is able to bring about unitary speed ratio, namely, when the centrifugal force of the masses in the carrier 50 is sufficient to prevent the planetating motion and so to compel the central gear 63 and driven shaft to turn at full speed, these several parts all going around with the fly wheel substantially as though locked together, thus giving an exceedingly quiet and effective transmission at unit ratio, free from interior play of the mechanism.

When the driven shaft load is increased to a point too great to be thus driven at full speed under any given conditions the ratio reduces and the fly wheel speed becomes temporarily reduced to a point where the centrifugal force of the masses is not sufficiently great to maintain unitary drive, which causes the main carrier 50 to planetate. The weights forced inward by the carrier 50 are discharged into the return carrier 40, thus imposing centrifugal force on that carrier, accelerating its planetating motion, and consequently delivering rotary energy and increasing the speed of rotation of the fly wheel. With this increase of speed the centrifugal force of the masses increases, thus increasing the torque delivered to the driven shaft, which was the object to be accomplished. In fact the action will adjust itself so as to drive the driven shaft at the greatest speed consistent with the delivery thereto of effective torque. Thus a self maintained balance is brought about, wholly by the action of the device, affording always the necessary torque for any given load conditions and the greatest possible speed available with such torque. All these adjustments take place without the need of human action, the car slowing down to the most advantageous speed, and receiving the necessary torque to overcome the road conditions; although the operator may of course always supplement the readjustment of conditions by means of the throttle, opening it to create increased torque and speed, and vice versa.

The successive centrifugal masses or weight portions moved inwardly by the main carrier, are discharged at or near their most inward point of movement. This could be a free discharge across the interior space, and the mercury maintained in a sort of pool within the outer part of the carrier, or the discharged mercury could be otherwise disposed of, and a supply of mercury suitably delivered to the outward portion of the main carrier. There would incur loss of power, and therefore as stated, I prefer to employ a second carrier, such as the interior pocket wheel 40, into which the main carrier discharges the centrifugal masses, and which carries them around outwardly and redelivers them to the main carrier. Each portion of the centrifugal weight in this way passes through two phases, taking part in the delivery of rotary energy to the driven shaft while being forced inwardly, and delivering energy back into the fly wheel or driving member, while moving outwardly. Fig. 2 indicates how the pockets of the main carrier discharge their masses into the pockets of the return carrier near the inward portions thereof. This discharge will not be uniform nor will one mass be transferred as an entity from an outer to an inner pocket, because the two carriers are always at different speeds, the inner carrier rotating at a steady high speed as long as the fly wheel rotates steadily, and the main carrier rotating at varying speeds from maximum to zero. In any case, no matter at what rate of discharge by the main carrier to the return carrier, the centrifugal masses received by the latter are carried around outwardly, and while so moving are influenced by centrifugal force to urge faster rotation of the return carrier, and therefore of the fly wheel. It will be noticed that the pockets of the two carriers are so designed that the main carrier holds its centrifugal masses until they have moved inwardly to the desired discharge point and then discharges them, while the return carrier pockets securely hold the masses during their return or outward movement and then release or deliver the masses back into the main carrier at or near their most outward point of travel. While the individual masses act as described, passing through 2 cycles, the conditions in both carriers are maintained continuously, so that the torque delivery and restoration are continuous actions, as already explained.

These transferring actions at the discharge and redelivery points will be seen to be effected or assisted by the centrifugal force existing in the system. As aforestated this refers to the centrifugal force due to the rotation of the driving member and fly wheel about the engine shaft or main axis of the apparatus. The rotation of the main carrier on its own planetating stud tends to produce a minor centrifugal action which, in the neighborhood of the point of discharge, may be said partially to oppose or offset the centrifugal force utilized by the present invention. It is, however, a simple matter to proportion the parts so that the secondary centrifugal force is unable to hamper the discharge action. Thus at the indicated point of discharge the main centrifugal force, pressing outwardly, is always greater than the oppositely acting centrifugal force due to the rotation of the carrier. This can be demonstrated on the drawings hereof as follows: We will assume a condition in which the driven shaft has zero speed, because at this speed the main carrier rotates at its maximum speed, giving maximum local centrifugal force. The mercury in any given pocket approaching the discharge point rotates about the main axis at a greater angular velocity than it does about the planetating axis. The fact that the gear 62 is greater than the gear 63 insures this. The angular velocities will be approximately in the ratio of three to two, and the centrifugal forces will therefore be about in the ratio of nine to four, centrifugal force being as the square of the speed, if we take the two radii of the mass as being equal. In other words under these extreme conditions, the force thrusting the mercury outwardly is at least twice the counteracting force. The mercury therefore seeks to transfer itself from the main carrier pockets to those of the return carrier at the discharge point. Each mercury portion carried around to the outward point is readily redelivered to the main carrier, both centrifugal forces acting to compel the mercury outwardly from the pockets of carrier 40 to the pockets of carrier 50. With increasing speeds of driven shaft, and approach of speed ratio toward unity, the possible effect of local counteracting centrifugal force becomes more and more negligible. This local force can, as stated, be easily reduced by obvious proportioning if a more thorough discharge action is required. Thus the stated proportion 3 to 2 for the gears 62 and 63 can be increased, for example, 5 to 2, obviously giving reduced speed of planetary rotation and diminished local centrifugal force; and further such effect is obtainable by locating the buckets nearer to the planetary axis. The embodiment of Figs. 4 and 5 also ensures transfer of mercury from the main carrier, by a forcing action, as will be described. Any deficiency in transmitting action may be overcome by increasing the axial dimensions of the carriers, and the weight of liquid, by increasing the engine speed, and otherwise.

I believe this to be the first known mechanism practically capable of producing steady continuous drive of the driven shaft with increased torque, and speed less than the driving shaft, under conditions of varying load, with torque and speed adjusting themselves. In one aspect the essence of the present invention is the movable carrier which is mounted in an eccentric location on the driving member or fly wheel, combined with the succession of circulating masses; the carrier being actuated by connections from the driven member, and therefore varying in speed, running the faster when the driven shaft runs the slower, and arranged so as to cause the succession of masses to circulate in such manner that each mass, while moving inwardly, toward the axis of the system, acts through its centrifugal force to resist or retard the carrier and thereby urge forward the driven member, each mass at the end of this action being displaced or discharged so that its further movement will not counteract and destroy the centrifugal action and results mentioned.

The driving connections of this invention therefore are of a yielding, rather than a positive character; the utilization of centrifugal force, for driving purposes gives a perfectly resilient connection between the two shafts, which is both effective and free from irregular or jerky action. At low engine speeds the centrifugal force is negligible, and there will be no transmission, thus having the effect of throwing out the usual clutch, and so dispensing with the need of a clutch; but as the speed increases the centrifugal force comes into operative effect, and drive takes place when the transmitted torque exceeds the load on the driven shaft. For similar reasons a vehicle can be allowed to run downhill, forwardly or backwardly, by sufficiently slowing the engine, and without any actual disengagement, resumption of drive being available at any moment by opening up the throttle so as to speed up the engine. Another point of utility is as follows. The frequency of speed shifting operations in the ordinary speed change gear have proven very objectionable. There is considerable inconvenience in the necessity of the frequent speed readjustment. Constructors of cars have been hampered by this fact in being compelled to introduce a relatively large ratio of speed reduction at the rear axle, so as to minimize the number of speed changes necessary in ordinary road conditions. A lesser reduction would be otherwise desirable for purposes of efficiency, and the present invention permits this, while securing maximum convenience and comfort, thus increasing the salability of the vehicle, and economizing fuel.

The problems of motor vehicle transmission are largely due to the conditions introduced by the use of the internal combustion or gasolene engine. Such engine constitutes perhaps the most advantageous source of power for motor vehicles. It is also true that in the most usual type of present day motor vehicle the application of this power for driving purposes is accomplished through what is well recognized to be a mechanical makeshift, namely the transmission gears, with a friction clutch between the engine fly wheel and gears. It is necessary to use this makeshift on account of certain peculiarities of the gasolene engine. In the first place the engine must be run at a certain speed, not only to develop power but even to exert effective torque. Therefore it becomes inherent that the engine must be in rotation before it is connected to the machine that it is going to drive. This is the first reason for the friction clutch. In the second place a gasolene engine of reasonable proportions for motor vehicle requirements is not capable in itself of delivering sufficient torque, or in the right way, to meet necessary road or driving conditions. Consequently a gear transmission is employed to give the engine the required mechanical advantage. It is necessary for the operator to shift these gears to change the speed ratio and overcome various driving conditions. In order to shift the gears the engine must first be disconnected from the same, which is the second reason for the friction clutch. It is obvious that if enough gear changes to meet all the various road conditions were supplied the operator would have an extremely inconvenient machine to handle. As a matter of practice with only the customary three speed gear shift, designers endeavor to so construct the machine that gear shifting is eliminated as much as possible. This is a compromise between the necessary resulting evils, and is usually at the cost of engine efficiency. It means a comparatively high speed engine with a large gear reduction at the rear axle. My invention, first of all, eliminates all gear shifting but still embodies the requirement of giving the engine the necessary mechanical advantage. This is accomplished by the fact that as the weight is drawn from the outside to the inside position against centrifugal force, which force is exerted as torque on the driven shaft, it is endowed with a potential energy due to this change of position. This potential energy is used up, as the weight moves from the inside to the outside position, and delivers an assisting torque to the driving parts, using the stationary element or central gear as a fulcrum in exerting this force. It is this delivery of energy to the driving parts through the stationary element that gives the required mechanical advantage, and the high torque delivered to the driven shaft.

Despite many suggested forms of transmission the prevailing one today is that in which a clutch is disengaged, gears then shifted by control levers to alter the ratio, in a step by step manner, followed by re-engagement of the clutch, the engine being throttled during these operations. The described shortcomings of such mechanisms are notorious, and I believe have not been satisfactorily overcome. The present invention is believed to be on wholly novel principles and to secure the several advantages and avoid the drawbacks hereinabove referred to.

The operation of the present invention it is thought will be understood from the hereinabove descriptions thereof. I might explain further that the masses of mercury, considered as acting cooperatively, may be said to establish, under any given conditions, a center of mass, which in some cases may stand upon a radius substantially at right angles to a line connecting the general axis and the planetating axis.

The unbalanced masses in the pockets may be considered as affording a centrifugal force which will be maintained steadily during steady conditions of load and speed. The condition of unbalance in the circulating masses is self sustaining because as fast as the main carrier discharges masses at the inner side it is taking them up at the outer side. There will be, however, constant minor variations in the amount of mass acting centrifugally, and in the center of mass, whenever variations in load or speed are taking place. When the driven load is light no actual rotation of the main carrier is necessary as the centrifugal force on the unbalanced masses in the carrier may be sufficient to transmit the torque necessary to overcome the load. The proportions and speeds of the illustrated embodiment are merely examples, and may be indefinitely altered. As shown, with the engine shaft turning 1000 R. P. M. and assuming a load such that the speed ratio becomes two to one it is possible to calculate the speeds of the various elements. The driven shaft turns at 500 R. P. M. The difference in speeds of driving and driven shafts is 1000 minus 500 equals 500 R. P. M. It is this difference which determines the speed of the main carrier or pocket wheel 50. With the gears 62 and 63 proportioned as shown the speed of the carrier will be $2/3$ of the difference, 500 R. P. M., or 333 R. P. M. With the shown proportions of the gears 30 and 31 the speed of the inner carrier 40 will be $4/5$ the fly wheel speed, that is, 800 R. P. M., considerably faster than the speed of the main carrier, but in the same direction. With increase of driven shaft speed, due to decrease of the load thereon, the main carrier decreases in speed until eventually its speed will become zero as the speed ratio of the transmission becomes unity. In this condition the inner carrier is still rotating but the main carrier has ceased turning on its own axis, and the mercury portions will simply lie in a number of the pockets of the main carrier continuously subject to centrifugal force. When the main carrier is discharging mercury portions to the inner carrier, that is when the transmission is driving at reduced ratio, it will be noticed that the discharged particles are moving forwardly in a proper direction to engage and act upon the inner carrier. If traveling somewhat slower than the inner carrier the centrifugal force of the masses will quickly speed them up until the pressure thereof operates in a forward direction upon the carrier. It should be noted that the essential force, the centrifugal force of the masses, which governs the present invention, is far more effective with the high engine speeds than with low, especially as centrifugal force is known to increase as the square of the speed. Increasing engine speed from say 800 to 1100 R. P. M. substantially doubles the centrifugal force and therefore the ability of the masses to transmit torque. This gives great elasticity of action, such that by manipulation of the throttle very high transmitting power and torque may be secured. When the engine is throttled down to a low speed it can not be accidentally stalled because the centrifugal force at low speeds is negligible, and the shafts are practically disconnected.

The invention may be described in one aspect as consisting of transmitting mechanism between the driving and driven members, which depends on centrifugal force for its operation, and of such character that continuous as distinguished from intermittent power transmission occurs, not merely at unit speed ratio, but irrespective of the conditions of load and ratio. In prior mechanisms utilizing centrifugal weights the transmission has been intermittent with reduced ratio, requiring special expedients to steady the motion of the driven shaft, such as pawl-and-ratchet and transmitting spring. With the present invention an increase of load brings about automatically a decrease of speed ratio accompanied by an increase in the torque delivered to the driven member, the transmission of torque being maintained continuously. The purpose of the centrifugal weights, or body of mercury, is to afford what may be termed a weight-train or mass-train, which as a whole is carried bodily around by the driving member, and the several portions of which, whether continuous, discontinuous, liquid or solid, are subject to centrifugal force and capable of inward movement against such force. The weight-train is arranged or guided to traverse a given path or circuit, the same being forced inwardly by any suitable connections from the driven member, such as the planetating gear and pocket wheel 50, so that the centrifugal force opposes a resistance, and effects the drive of the driven member in direct opposition to the load or drag thereon. The mechanism is self adjusting, giving increased continuous torque on the driven shaft, accompanied by decrease of speed ratio, when compelled by the increase of load. In a sense the centrifugal device, carried around with the driving member, is arranged, by reason of the described or other connections from the driven member, so that the centrifugal force in the device is continuously opposed to the load on the driven member. As the load slows down the driven member so that the carrier 50 planetates, thereby delivering mercury to the return carrier, and increasing the speed of the fly wheel, the centrifugal force of the mercury is intensified to such a point that the increase in load is overcome and the necessary torque delivered to drive the driven shaft. A continuous centrifugal force is thus created by the parts carried along with the driving member, and this is continuously transmitted as an uninterrupted, although variable, torque to the driven member.

Figure 3:
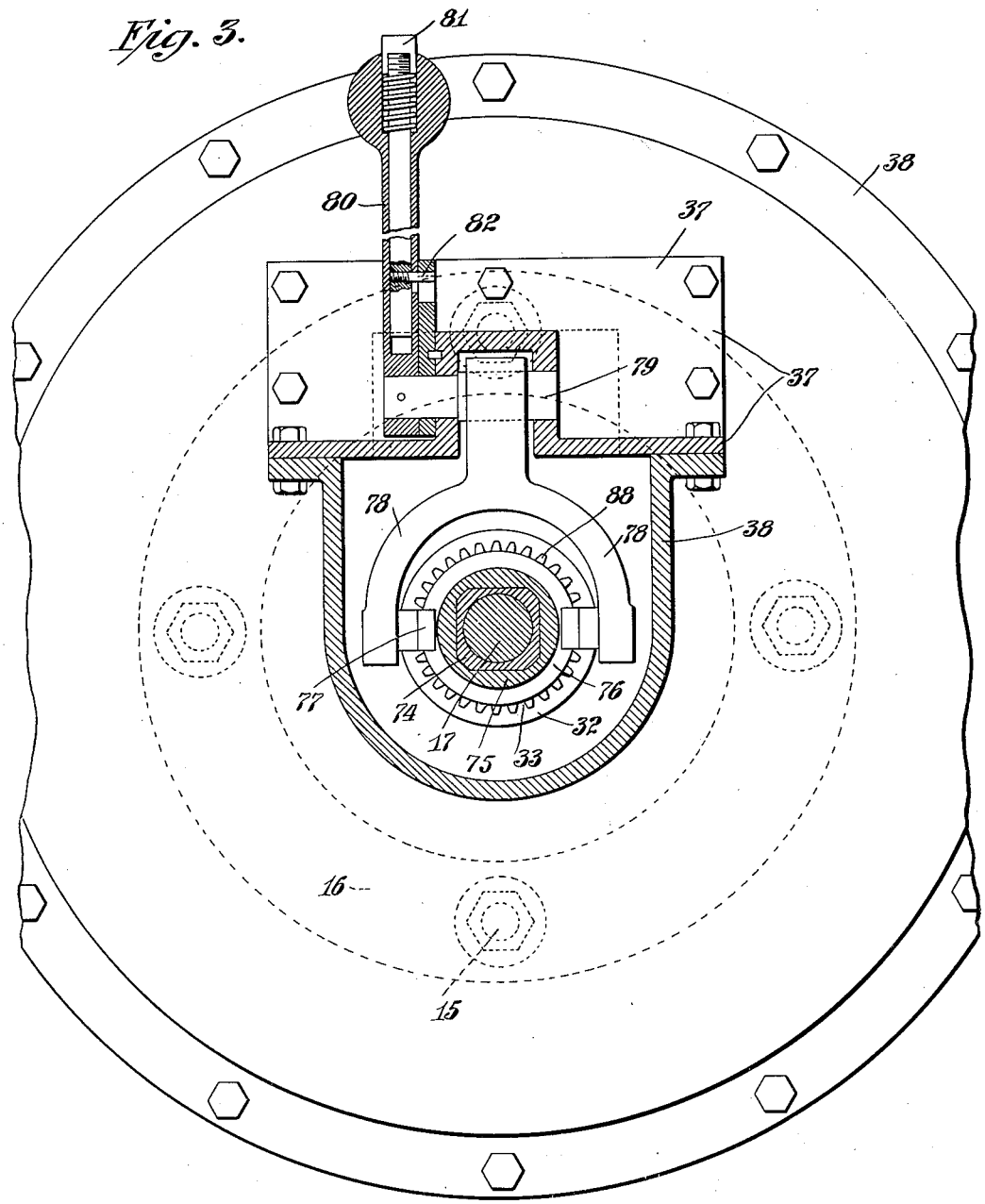
Fig. 3 is a transverse section taken on the broken line 3—3 of Fig. 1.
Figure 4:
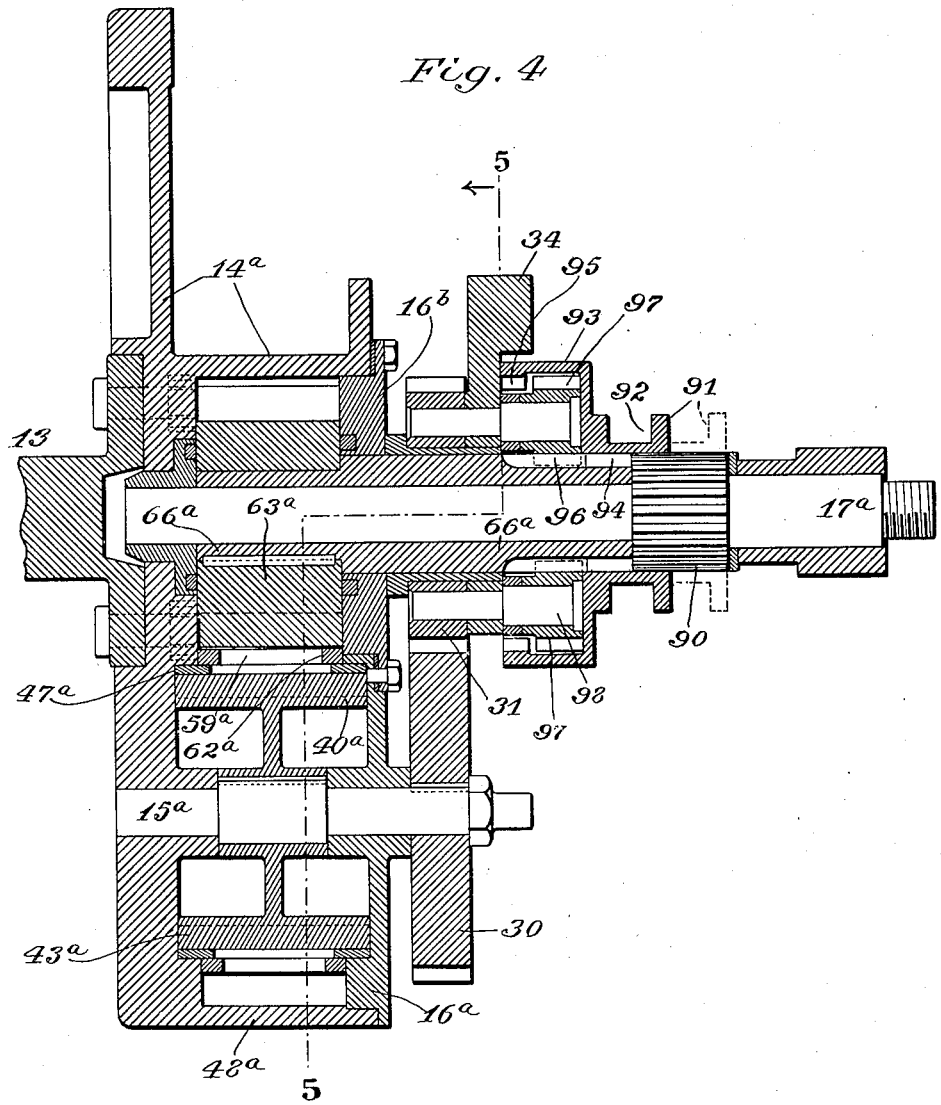
Figs. 4 and 5 are views like Figs. 1 and 2, showing a modification of part of the mechanism thereof.
Figure 5:
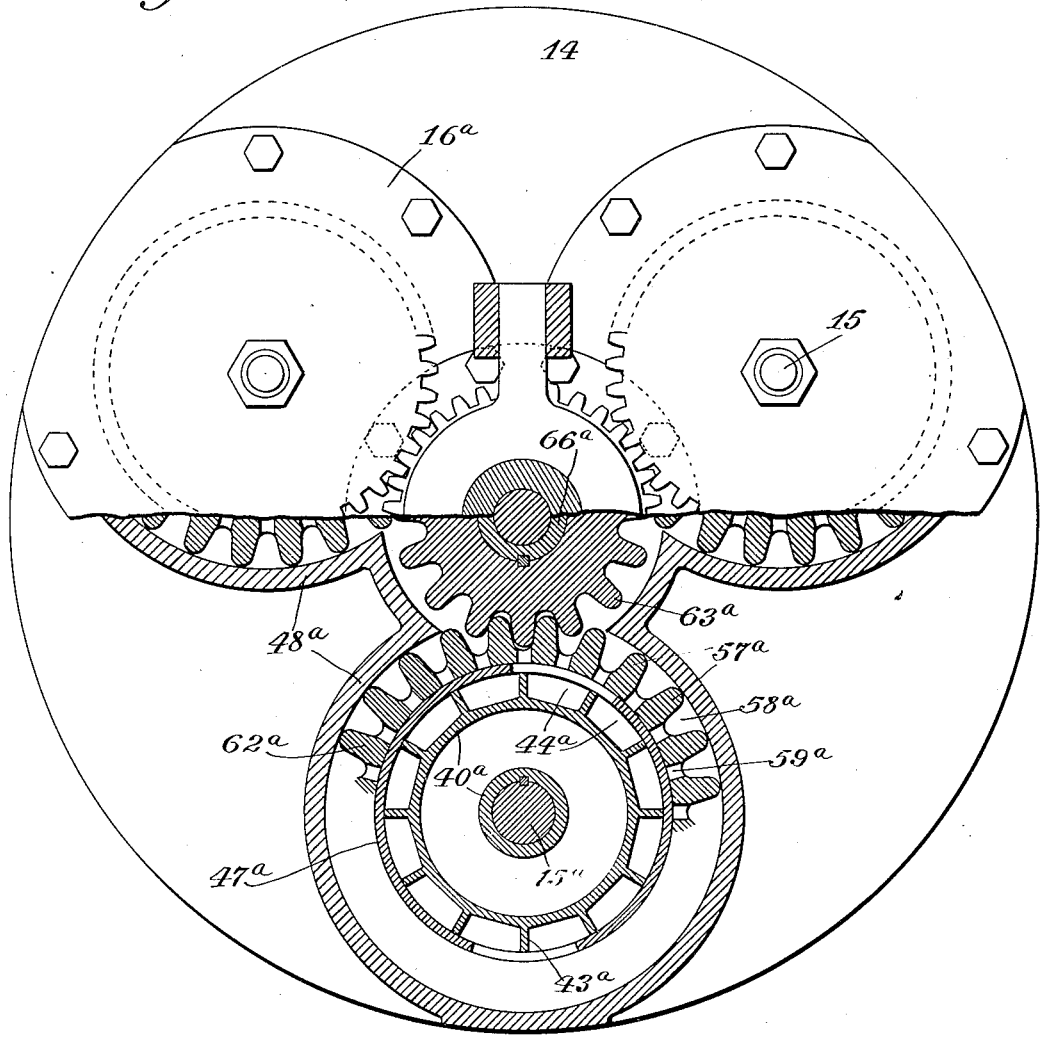

Figs. 4 and 5 show a modification in which the planet gear $62^a$ is used as a pocket wheel or main carrier. The gear teeth $57^a$ constitute walls or vanes forming chambers $58^a$ between them, and slots $59^a$ extend inwardly for communication with the pockets or chambers $44^a$ formed between the vanes or walls $43^a$ of the inner carrier $40^a$. A wall $47^a$ is shown between the two carriers, cut away at the outer and inner points where the transfer of mercury occurs. A wall $48^a$ surrounds the outer pocket wheel or gear, but is cut away to permit the teeth to mesh with the central gear $63^a$, and is a sufficiently close fit to effectually prevent mercury escaping from one pocket $58^a$ to another. The three walls $48^a$ are shown in Fig. 5 as being connected, giving enclosure of the form of a clover leaf. The outer carrier $62^a$ constitutes not only a pocket wheel for the mercury portions but also constitutes a planetating gear corresponding with the gear 62 in Figs. 1 to 3. The gear $62^a$ is shown engaging a corresponding central gear $63^a$ keyed to the sleeve $66^a$ which surrounds the driven shaft $17^a$. The inner pocket wheel $40^a$ is shown keyed to the planetating shaft $15^a$. This shaft and inner pocket wheel are constantly rotated in the same way as in Figs. 1 to 3, by means of a planet gear 30 mounted on the shaft $15^a$ and engaging a central gear 31 which has secured to it an arm 34 by which it is stationarily anchored. The fly wheel casting $14^a$ supporting the described parts is of different form from that in the other figures. The interior space, enclosed peripherally by the walls $48^a$ is closed at the rear side by a clover-leaf-shaped plate $16^a$, which gives support to the studs $15^a$ in the same manner as the supporting ring 16 of the other figures. The enclosing wall $16^a$ is supplemented by an annular wall $16^b$ secured to the wall $16^a$ and extending inwardly therefrom into contact with the sleeve $66^a$. As liquid mercury is being handled in the respective chambers of the pocket wheels which are enclosed by the walls described, suitable packing material may be provided at proper points to minimize escape of the mercury.

The structure shown in Figs. 4 and 5 contains a number of distinctive features, which may be used in the combination shown, or in other combinations. The main carrier $62^a$ is a movable device actuated to thrust the successive mass portions inwardly guided by the fixed curved wall $48^a$ at the exterior and the fixed curved wall $47^a$ at the interior. The successive vanes or thrust members $57^a$ move around like pistons between the walls and they enclose a series of pockets $58^a$ between them, each pocket opening both exteriorly and interiorly, but closed by the fixed walls at proper times. The exterior wall 48ᵃ is interrupted to receive the element 63ᵃ which may be considered either as a gear meshing with the vanes to drive the carrier or as an ejector entering between the vanes to force the masses from the pockets. The teeth of the central gear 63ᵃ act like pistons, working in the pockets 58ᵃ, and so displacing the mercury interiorly into the pockets of the return carrier. The walls 48ᵃ and 47ᵃ are concentric and thereby enclose between them a curved channel along which the thrusting elements and masses travel, a feature new herein. The wall 47ᵃ constitutes a concentric separating wall between the exterior and interior carriers, one being at each side of the wall and each carrier delivering to the other through suitable interruptions at the outward and inward parts of the wall. All of the working parts referred to are enclosed within a hollow casing, namely, the wall 48ᵃ, which in fact is extended around so as to enclose a number of the carrier systems. The fly wheel 14 may be considered as a revolving support turned by the driving member or shaft, and shown as attached directly to the driving shaft.

The shifting clutch and reversing devices are shown in Figs. 4 and 5 as follows. Clutch teeth 90 in the form of a pinion are arranged fast on the driven shaft. A reversing slide 91 is in the form of a sleeve, snugly fitting the exterior of sleeve 66ᵃ and pinion 90, and grooved at 92 for shifting purposes, and having a cylindrical extension 93 of larger diameter. The clutch slide has teeth 94 extending inwardly, always in engagement, partly or wholly, with the teeth 90 on the driven shaft. The slide is shown standing at forward position, left in Fig. 4, with the teeth 94 partly disengaged from teeth 90 and partly engaged with teeth 96 to be described, giving forward drive. The sleeve extension carries clutch teeth 95, which may also act as an internal gear during reverse drive. The sleeve 66ᵃ is formed with clutch-and-gear teeth 96, their right hand ends shown engaging the teeth 94 of the slide. Planet pinions 97 are shown, mounted on studs 98, which may also be the means of connecting the stationary central gear 31 with the fixed arm 34. With forward drive, as shown, the pinions 97 are being turned idly by the teeth 96 on the rotating sleeve 66ᵃ. The sleeve is being turned forwardly continuously through central gear 63ᵃ in a manner already explained, and the driven shaft being locked to the sleeve by teeth 96 and 94 the driven shaft turns forwardly. If the reversing slide be shifted wholly to the right, to the shown dotted position, the driven shaft is freed from the sleeve, while the teeth of internal gear 95 are caused to engage the planet pinions 97. The teeth 96 of the sleeve, acting as a gear, drive the pinions 97, which reversely drive the reversing slide and therefore the driven shaft. If adjusted to a middle position, all the parts are locked together and the driven shaft is held against rotation.

Hereinabove has been described the structure of Figs. 1 to 3 as regards driving in a forward direction followed by a description of Figs. 4 and 5 as regards both forward drive and reversal at will. Now will be described the structure contained in Figs. 1 to 3 for effecting the reversal of direction of drive.

The hub 64 to which the central gear 63 is secured has been treated as being rigid with the driven shaft 17, but this is true only during forward drive. The hub carries at its left end a bevel gear 65. The hub and gear surround a sleeve 66 which in turn surrounds the driven shaft. The sleeve extends considerably to the right, for taking part in the reversing of the drive, and at a middle point has a positioning flange or rib 67, between which and the hub 64 is located the stationary central gear 31, already mentioned.

The sleeve 66 surrounding the driven shaft carries near its left end a series of bevel pinions 69, engaging the bevel gear 65 at one side, and at the other side engaging the bevel gear 25, already mentioned, which is keyed to the driven shaft. Four such pinions 69 are shown, turning upon the same number of short stud shafts 70, projecting outwardly from recesses in the sleeve 66. An outer holding ring 71 steadies the extremities of the studs, and the illustrated inner ring 72 may be rigid or integral with the outer ring, so that the system of bevel pinions, always turning with the sleeve 66, is maintained as a rigid system, efficient for transmission between the bevel gears. It will be clear that when the sleeve 66 is rendered rigid with the driven shaft the system of bevel gears and pinions becomes rigid, and the gear 63 becomes a part of this rigid system, for the purposes of the described forward driving action. When the sleeve is free to turn relatively to the driven shaft, rotation between the bevel gears and pinions is possible, and this takes place during reverse drive, as will be explained.

The right hand extension 74 of the central sleeve 66 is shown flattened or squared in cross section, and it always carries around with it the reversing slide 75, which is capable of being moved right and left in the process of reversing. In order to shift the slide it is shown as formed with a circumferential groove 76 engaged by the two roller studs 77 at the opposite sides of a yoke arm 78 secured upon a shaft 79 mounted in the fixed frame part 37. From another part of the shaft 79 extends a handle 80, serving as the reversing lever of the mechanism. A locking member or button 81 on the handle operates a locking pin 82 which may thus be engaged with one or another of the three notches 83, 84 and 85, the three positions giving adjustments respectively for forward drive, locking against either drive, and reversing drive.

The reversing slide 75 is provided with two sets of clutch teeth 87 and 88 respectively, the former arranged to engage the teeth 24 of the member 23 keyed to the driven shaft, and the latter engaging the teeth 33 provided on the stationary member or gear 31. Fig. 1 shows both sets of teeth engaged and thereby the driven shaft, through the reversing slide, is locked to the stationary parts of the mechanism, and thus incapable of rotation. The reversing handle 80 is in its central position. If it be moved to the left in Fig. 1 so that the pin 82 will engage the notch 83 the reversing slide becomes disengaged from the stationary parts, and remains engaged only with the teeth 24, connected to the driven shaft. By this the central sleeve 66 is locked to the driven shaft and forward drive takes place in the manner explained.

If the reversing handle be thrown to the other extreme the slide 75 is shifted to disengage the teeth 23 and engage only the stationary teeth 33. In other words, by this adjustment the central sleeve 66 is rendered stationary. Therefore, the pressure or tendency which causes rotation of the central gear 63, will no longer tend to directly rotate forwardly the driven shaft, but will afford reverse drive in the following manner. The gear 63 carries the bevel gear 65. The studs 70 carrying the bevel pinions 69, being held stationary with the sleeve 66, the rotation of the bevel gear 65 will operate through the pinions to turn the opposite bevel gear 25, and therefore the driven shaft, in the reverse direction.

The reversal could obviously be effected in various other ways, for example, by a wholly separate reversing device, outside of the present invention, but the described arrangement is compact and efficient, and sufficiently illustrates the purposes to be accomplished and the principles thereof.

Subject matters and features which are not made the subject of claim herein are either reserved for other applications or are disclaimed. For example, the broad claims herein, and the claims referring to the features shown in Figs. 1 to 3, with some specific exceptions, have been transferred to a continuation application filed by me November 3, 1923, Serial No. 672,508, to which the present application is now intended to be subordinate.

It will thus be seen that I have described a power transmission method and apparatus embodying the principles and attaining the objects and advantages of the present invention. Since many matters of construction, arrangement, combination, design and detail may be variously modified without departing from the principles involved, it is not intended to limit the scope of the present invention except in so far as set forth in the appended claims.

What is claimed is:

1. Power transmission apparatus comprising in combination the rotating driving and driven members, a stationary member, a support revolved by the driving member, a movable thrusting device supported on the support, a plurality of mass portions adapted to be successively engaged and thrust inwardly by said device, connections from the driven member to the device for actuating the device when the driven member is rotating slower than the driving member, whereby the mass portions are thrust inwardly in succession, and caused to traverse a circuit in the same direction as the revolution of the support, and their centrifugal force is applied as continuous torque on the driven member, a second movable device on said support, and connections between the stationary member and second movable device, acted upon by the outward movement of the mass portions, whereby the centrifugal force thereof is applied as forward pressure on the driving member.

2. Power transmission apparatus as in claim 1 and wherein the connections from the driven member to the first movable device actuate the device at a rate in accordance with the speed difference between the driving and driven members, whereby actuation ceases when the speed ratio is unity.

3. Power transmission apparatus as in claim 1 and wherein the first device is a planetating carrier revolved by the driving member and rotated by the driven shaft connections, and formed with a succession of holders for the mass portions, and the second device is a planetating carrier adjacent the first carrier to receive the successive mass portions discharged by the first carrier.

4. Power transmission apparatus as in claim 1 and wherein the first device is a planetating carrier revolved by the driving member and rotated by the driven shaft connections, and formed with a succession of holders for the mass portions, and the second device is a planetating carrier adjacent the first carrier to receive the successive mass portions discharged by the first carrier and the connections from the stationary member to the second carrier operating to rotate it in the same direction as the rotation of the revolving support, whereby the centrifugal force of the outwardly returning masses imposes forward thrust on the driving member.

5. Power transmission apparatus comprising in combination the rotating driving and driven members, a body of flowing mass capable of being forced inward in successive masses, a support revolved by the driving member, a pocket wheel mounted in planetating position on the support to engage and force inwardly the successive masses, and discharge them, and connections from the driven member to the pocket wheel for causing the rotation of the pocket wheel in the same direction as the driving member rotation, and a second pocket wheel receiving the discharged masses and conducting them outwardly for redelivery to the first wheel.

6. Power transmission apparatus comprising in combination the rotating driving and driven members, a successively acting series of masses, a support revolved by the driving member, a planetating carrier on the support to force said masses inwardly successively and discharge them, aided by the centrifugal force in the masses, connections from the driven member to the carrier for causing the rotation of the carrier, and means acting upon the masses in the carrier to assist their discharge at inward position.

7. Power transmission apparatus comprising in combination the driving and driven members, a support revolved by the driving member, a number of masses, a planetating wheel mounted on the support and connection from the driven member, to the wheel for rotating it, said wheel having a succession of pockets to engage the masses successively and bodily carry each inwardly, and means for effecting the discharge of the masses from the pockets.

8. Apparatus as in claim 7 and wherein are cooperating members entering the pockets and acting on the masses therein to force them inwardly from the pockets.

9. Apparatus as in claim 7 and wherein the pockets of the wheel are constituted between exterior teeth constituting a planetating gear, and a central gear engaging said teeth, said wheel having passages for inward discharge from said pockets, whereby the engagement of the gear therewith assists the discharge of the masses.

10. Power transmission apparatus comprising in combination the rotating driving and driven members, a support revolved by the driving member, a body of flowing mass capable of being forced inward in successively masses, a pocket wheel mounted in planetating position on the support to engage and force inwardly the successive masses, the same consisting of a planetating gear with pockets between the teeth, and discharge passages from the pockets to the interior of the gear, and a second gear engaging the planetating gear and assisting the discharge of the masses.

11. Apparatus as in claim 10 and wherein the second gear is a central gear on the driven member and acting to rotate the pocket wheel.

12. Apparatus as in claim 10 and wherein is an interior pocket wheel arranged to receive the discharged masses and carry them outwardly for redelivery to the first pocket wheel.

13. Power transmission apparatus comprising in combination the driving and driven members, a revolving support turned by the driving member, a movable device on the support, connections from the driven member to the device for actuating it, said device having mass thrusting means, a centrifugal mass adapted to be engaged by said thrusting means and thrust inwardly toward the axis of revolution, and means for disengaging the mass from the thrusting means when moved inwardly.

14. Power transmission apparatus as in claim 13 and wherein the mass thrusting means is a holder with which the mass bodily engages, and the disengaging means comprises an ejector cooperating with the holder to eject the mass.

15. Power transmission apparatus as in claim 13 and wherein are a series of thrusting means engaging successive mass portions, and a series of disengaging elements operating to eject the several masses from the respective pockets.

16. Power transmission apparatus as in claim 13 and wherein is a second movable device to receive each discharged mass and conduct it outwardly.

17. Power transmission apparatus comprising in combination the driving and driven members, a revolving support turned by the driving member, a movable device on the support connections from the driven member to the device for actuating the device, said device having a series of pockets to engage successive mass portions and thrust the same inwardly toward the axis of revolution, and means for ejecting each mass from its pocket when moved inwardly.

18. Power transmission apparatus as in claim 17 and wherein the pockets open inwardly whereby to receive and discharge the masses interiorly, while the ejecting means enter the pockets exteriorly.

19. Power transmission apparatus as in claim 17 and wherein the pockets are open inwardly to discharge the masses interiorly and are also open exteriorly to receive the ejecting means, and a wall closing the pocket exterior openings when not engaged by the ejecting means.

20. Power transmission apparatus as in claim 17 and wherein the ejecting means consists of a toothed wheel with teeth arranged to enter the pockets.

21. Power transmission apparatus comprising in combination the driving and driven members, a revolving support turned by the driving member, a centrifugal mass, a guide on said support for guiding the mass, a movable device on said support arranged to thrust the mass inwardly guided by said guide, and actuating connections from the driven member to the movable device.

22. Power transmission apparatus as in claim 21 and wherein the guide for the mass is a fixed wall on the revolving support, and the thrusting device is arranged to travel along said wall.

23. Power transmission apparatus as in claim 21 and wherein the guide is an arc-curved wall fixed on the support, and the movable thrusting device is a planetating carrier with a thrust element traveling adjacent to said wall.

24. Power transmission apparatus as in claim 21 and wherein the guide is a curved wall, and the movable device is a planetating carrier with vanes traveling along the wall, adapted to force the mass along the wall and discharge it, the wall being interrupted at the discharge point.

25. Power transmission apparatus as in claim 21 and wherein the movable device has a series of mass holding pockets for receiving and discharging mass portions, and the guide is a curved wall closing the pockets.

26. Power transmission apparatus as in claim 21 and wherein the movable device is a planetating carrier having a series of mass thrusting vanes, and the guide is an exterior wall along the interior of which the vanes travel.

27. Power transmission apparatus as in claim 21 and wherein the movable device is a planetating carrier having a series of mass thrusting vanes, and the guide is an exterior wall along the interior of which the vanes travel, the wall being interrupted, and the carrier being engaged exteriorly by a toothed wheel meshing with such vanes.

28. Power transmission apparatus as in claim 21 and wherein the movable device is a planetating carrier having a series of mass thrusting vanes, and the guide is an exterior wall along the interior of which the vanes travel, the wall being interrupted, and the carrier being engaged exteriorly by mass ejecting means, entering between the vanes.

29. Power transmission apparatus comprising in combination the driving and driven members, a revolving support turned by the driving member, a centrifugal mass, a planetating means on said support arranged to thrust the mass inwardly, connections from the driven member actuating said means, and concentric walls forming a curved channel in which the mass travels while so thrust.

30. Power transmission apparatus as in claim 29 and wherein the thrusting means comprises a series of thrust elements traveling around in such channel and operating upon a succession of mass portions.

31. Power transmission apparatus as in claim 29 and wherein the thrusting means comprises a series of thrust elements traveling around in such channel and operating upon a succession of mass portions, and one of said walls is interrupted for the reception and discharge of masses.

32. Power transmission apparatus as in claim 21 and wherein is a second movable device, the first device arranged to discharge the mass when moved inwardly, and the second device arranged to receive the discharged mass, conduct it outwardly and redeliver it to the first device.

33. Power transmission apparatus comprising in combination the driving and driven members, a revolving support turned by the driving member, a centrifugal mass, a fixed wall on said support for guiding the mass, a movable device on said support arranged to thrust the mass inwardly guided by said wall, connections from the driven member to said device for actuating it, and a second movable device at the other side of said wall, the wall being interrupted for delivery from one device to the other at inward and outward points.

34. Power transmission apparatus as in claim 33 and wherein the devices are planetating carriers concentrically arranged and the wall a curved wall between them.

35. Power transmission apparatus comprising in combination the driving and driven members, a revolving support turned by the driving member, a hollow casing fixed on said support, a centrifugal mass inside the casing, and a movable device inside the casing adapted to engage and carry the mass inwardly against its centrifugal force.

36. Power transmission apparatus as in claim 35 and wherein the mass is a body of flowing material confined by the casing, and the device is a planetating carrier adapted to thrust successive mass portions inwardly and there discharge them.

37. Power transmission apparatus as in claim 35 and wherein are a plurality of such mass carrying devices within the casing and spaced around the center of revolution.

38. Power transmission apparatus as in claim 35 and wherein is a second movable device enclosed in the casing and adapted to receive the mass discharged from the first device and conduct it outwardly.

39. Power transmission apparatus as in claim 35 and wherein is a second movable device enclosed in the casing and adapted to receive the mass discharged from the first device and conduct it outwardly; said devices consisting of concentrically arranged planetating carriers, working inside the casing.

In testimony whereof, I have affixed my signature hereto.

JOHN REECE.